UNITED STATES PATENT OFFICE.

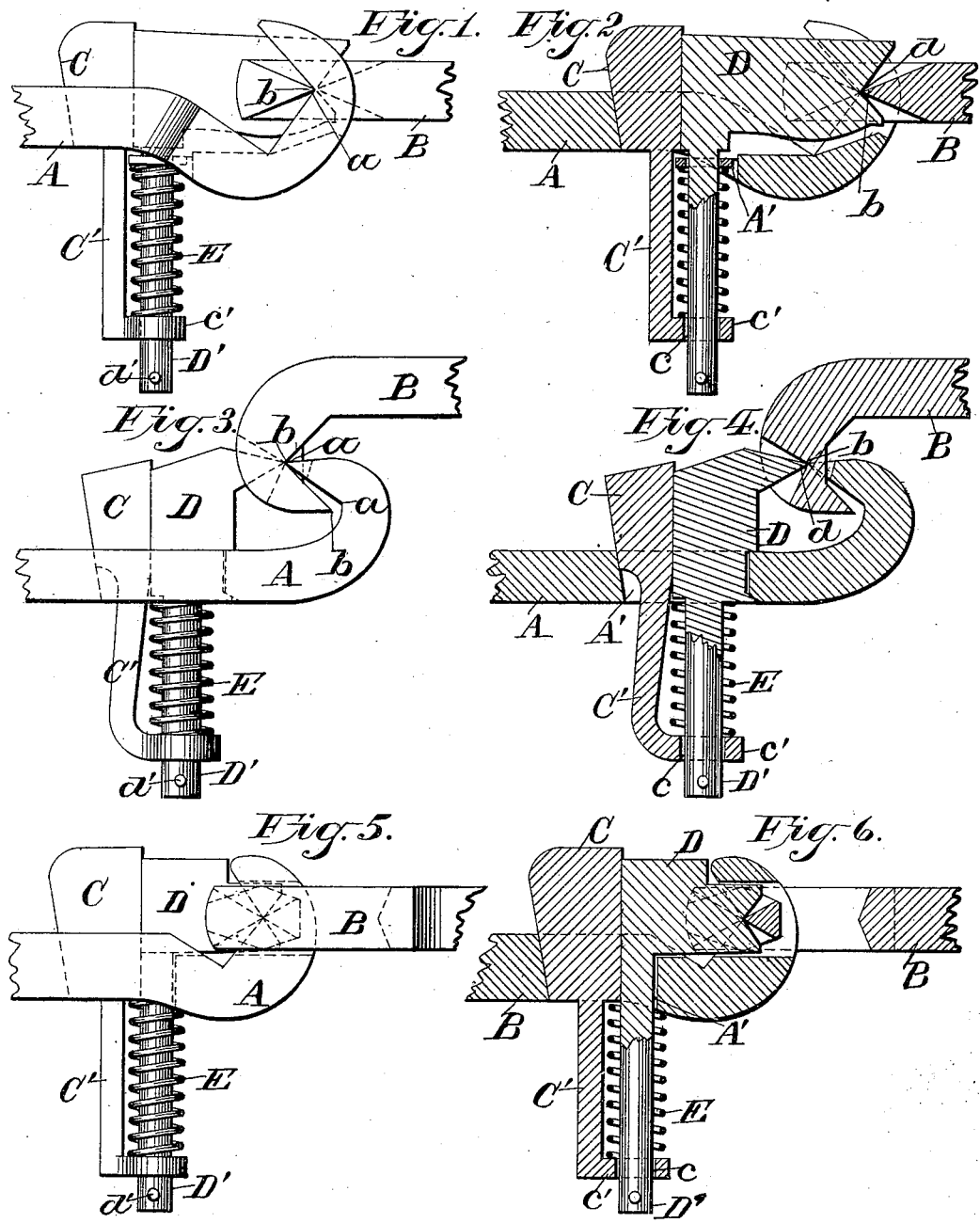

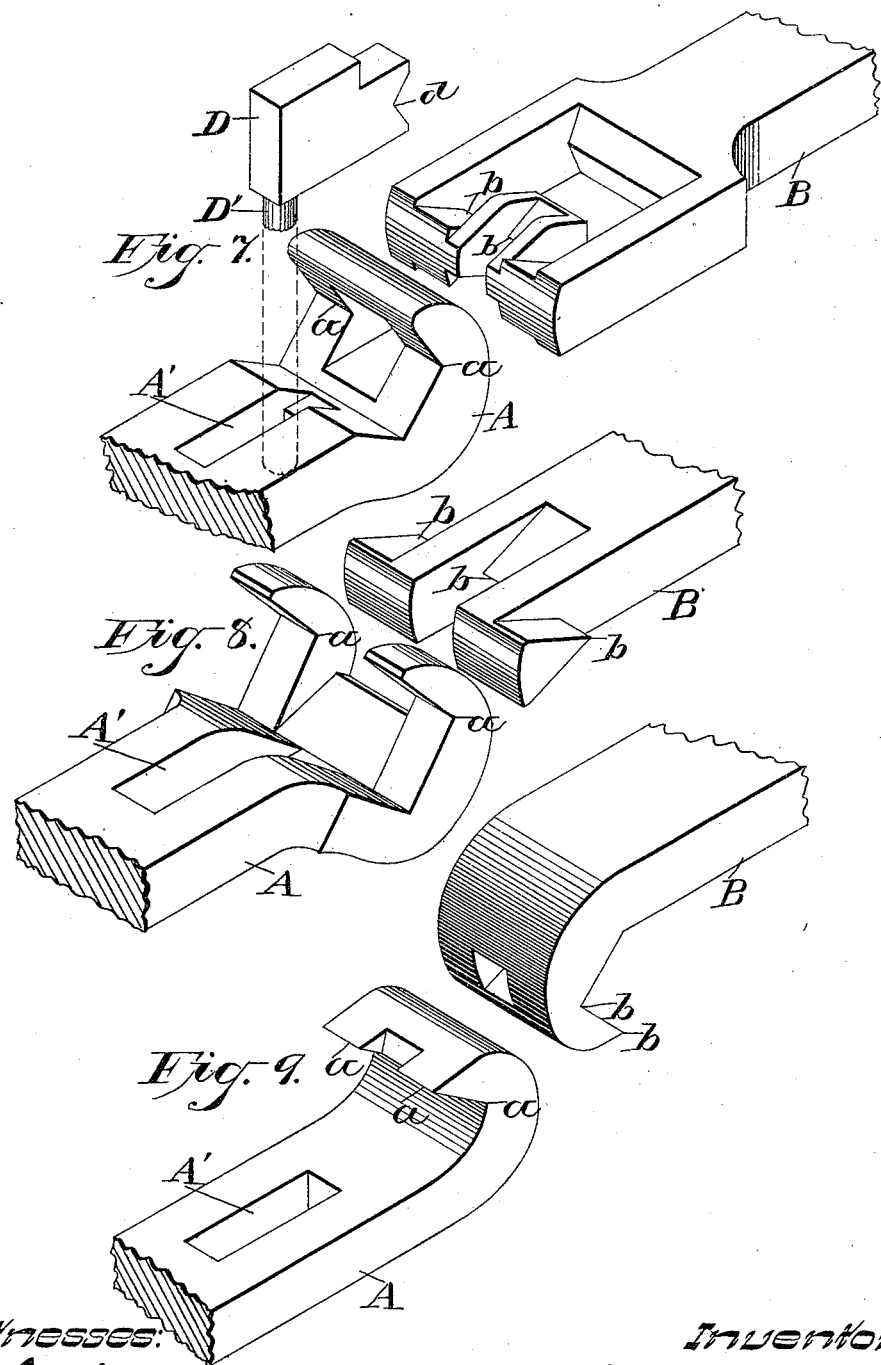

BENJAMIN F. SWEET, OF FOND DU LAC, WISCONSIN.

COUPLING-JOINT.

SPECIFICATION forming part of Letters Patent No. 334,305, dated January 12, 1886.

Application filed July 21, 1885. Serial No. 172,225. (No model.)

*To all whom it may concern:*

Be it known that I, BENJAMIN F. SWEET, of Fond du Lac, in the county of Fond du Lac, and in the State of Wisconsin, have invented certain new and useful Improvements in Coupling-Joints; and I do hereby declare that the following is a full, clear, and exact description thereof.

My invention relates to joints for uniting different parts of machinery; and it consists in providing a double sharp vibrating bearing, as will be more fully set forth hereinafter.

In the drawings, Figures 1 and 2 are respectively a side elevation and vertical longitudinal section of one form of my improved joint. Figs. 3 and 4 and Figs. 5 and 6 are similar views of another form of said joint. Fig. 7 is a detail perspective view of the part shown in Figs. 5 and 6. Fig. 8 is a like view of the parts shown in Figs. 1 and 2, and Fig. 9 is a similar view of the parts shown in Figs. 3 and 4.

In all the different forms of my device herein illustrated the principle and method of operation are the same, notwithstanding certain variations in specific construction.

In each form there are two bars or parts, A and B, and the part A has the slot A', for the reception of the locking-key C D. The part A has also the bearing points or edges $a\ a$, and the part B has the bearing points or edges $b\ b$, while the part D of the key has the bearing edge or point $d$. These bearing-points consist of sharp edges in one part and the deepest line of the depression in the opposing part, and when the parts are put together and locked in place, as shown, one part will rock or vibrate on the other.

In the form shown in Figs. 1, 2, and 8 the bearing-points $a\ a$ in the part A and the bearing-point $d$ in the part D are in the form of the described recesses, while the bearing-points $b\ b\ b$ in the part B are the sharp edges.

In the form shown in Figs. 3, 4, and 9 the part A has bearing-points of both kinds, and so has the part B, while the part D has only the sharp edge $d$, without recesses.

In the form shown in Figs. 5, 6, and 7 the parts A and D have only the recessed form of bearing-surfaces, and the part B has only the sharp-edged form, and the style shown in Figs. 5, 6, and 7 is only an inclosed form of the device illustrated in Figs. 1, 2, and 8.

Numerous modifications of these arrangements can be made by interchanging the recess of one part for the sharp edge of the opposing part, and vice versa, without departing from the spirit of my invention, it being only requisite that the sharp edge or point of one part shall meet with the sharp recess of the opposing part, as already described.

The key C D is thus constructed: The part C has a depending stem, C', with foot $c'$, and the latter is perforated, at $c$, to admit the stem or shank D' of the part D, and around this shank D', between the part A and the foot $c'$, is placed a coiled spring, E, by means of which the parts are kept in place after they are all put together, as shown, and the head of the key C has been pushed down to place within the slot A'. In order to release the parts, the part C is pushed up out of the said slot A', (compressing the spring E thereby,) when the parts will all be sufficiently loosened for detachment. A pin or key, $d'$, inserted through a perforation in the end of the stem D', outside of the foot $c'$, serves to prevent the accidental separation of the parts C D of the locking-key, when the spring E is compressed for any purpose.

My device is capable of a variety of uses—such, for instance, as valve-rod connections for steam-engines, for bearings for weighing-scales, for connecting sickle-bars and pitmen in reapers, for bearings and connections to windmills, for shaft-couplings for vehicles, and, in fact, for any style or sort of machinery where it is desired to provide a vibrating bearing or connection between any of the parts; and hence I do not limit my invention to any particular use, but claim it broadly wherever it is capable of application.

Having thus described my invention, what I claim as new, and desire to secure by Letters Patent, is—

1. A coupling-joint consisting of two parts and a locking-key having sharp edges and opposing sharp recesses, whereby a rocking or vibrating bearing is afforded at the points of contact, substantially as set forth.

2. A coupling-joint consisting of the parts A and B, with sharp edges and opposing sharp recesses $a\ b$, and the locking-key C D, the part D having a similar sharp bearing point or edge rocking upon a bearing point or edge in the part B, substantially as set forth.

3. A coupling-joint consisting of the part A, having slot A', and bearing points or edges a, the part B, with opposing bearing points or edges b, the locking-key C D, the part C having extension C' with perforated foot c', and the part D having a bearing-point, d, and a stem, D', passing through the perforation in the foot c', and the spring E, substantially as set forth.

In testimony that I claim the foregoing I have hereunto set my hand, at Milwaukee, in the county of Milwaukee and State of Wisconsin, in the presence of two witnesses.

BENJAMIN F. SWEET.

Witnesses:
H. G. UNDERWOOD,
E. G. ASMUS.